(12) United States Patent
Jeon et al.

(10) Patent No.: US 11,063,454 B2
(45) Date of Patent: Jul. 13, 2021

(54) BATTERY CONTROL METHOD AND APPARATUS

(71) Applicant: Samsung Electronics Co., Ltd., Suwon-si (KR)

(72) Inventors: Jinyong Jeon, Yongin-si (KR); YoungJae Kim, Seoul (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 15/915,628

(22) Filed: Mar. 8, 2018

(65) Prior Publication Data

US 2019/0089178 A1    Mar. 21, 2019

(30) Foreign Application Priority Data

Sep. 21, 2017    (KR) .................. 10-2017-0122022

(51) Int. Cl.
| | | |
|---|---|---|
| *H02J 7/00* | (2006.01) | |
| *H02J 1/10* | (2006.01) | |
| *H02P 27/06* | (2006.01) | |
| *B60L 58/12* | (2019.01) | |
| *H02M 3/158* | (2006.01) | |

(52) U.S. Cl.
CPC ............ *H02J 7/0063* (2013.01); *H02J 1/102* (2013.01); *H02J 7/0029* (2013.01); *B60L 58/12* (2019.02); *H02J 7/0026* (2013.01); *H02J 2007/0067* (2013.01); *H02J 2207/20* (2020.01); *H02M 3/158* (2013.01); *H02P 27/06* (2013.01)

(58) Field of Classification Search
None
See application file for complete search history.

(56) References Cited

U.S. PATENT DOCUMENTS

| | | |
|---|---|---|
| 8,054,038 B2 | 11/2011 | Kelty et al. |
| 8,117,857 B2 | 2/2012 | Kelty et al. |
| 8,508,191 B2 | 8/2013 | Kim et al. |
| 8,618,775 B2 | 12/2013 | Hermann et al. |
| 8,624,560 B2 | 1/2014 | Ungar et al. |
| 8,961,203 B2 | 2/2015 | Lee |
| 8,972,213 B2 | 3/2015 | Zhang et al. |
| 2005/0194937 A1 | 9/2005 | Jacobs |
| 2011/0273024 A1 | 11/2011 | Butzmann |

(Continued)

FOREIGN PATENT DOCUMENTS

| | | |
|---|---|---|
| JP | 2013-255320 A | 12/2013 |
| JP | 2014-3771 A | 1/2014 |

(Continued)

OTHER PUBLICATIONS

Extended European Search Report dated Nov. 2, 2018 in Corresponding European Patent Application No. 18170328.1 (7 pages in English).

*Primary Examiner* — David V Henze-Gongola
(74) *Attorney, Agent, or Firm* — NSIP Law (57) ABSTRACT

A battery control method that calculates a boosting ratio for converters based on voltage values of batteries and a preset voltage value, and transmits the calculated boosting ratio to the converters is disclosed. The converters are configured to boost output voltages of the batteries based on the calculated boosting ratio, and a sum of the boosted output voltages is equal to the preset voltage value.

8 Claims, 9 Drawing Sheets

(56) References Cited

U.S. PATENT DOCUMENTS

| | | | |
|---|---|---|---|
| 2012/0181873 A1 | 7/2012 | Butzmann et al. | |
| 2012/0319652 A1* | 12/2012 | Namou | H02J 1/108 320/116 |
| 2013/0038289 A1 | 2/2013 | Tse | |
| 2016/0311328 A1 | 10/2016 | Kim et al. | |
| 2017/0194673 A1 | 7/2017 | Jeon | |
| 2020/0076206 A1* | 3/2020 | Goto | H01M 10/44 |

FOREIGN PATENT DOCUMENTS

| | | | |
|---|---|---|---|
| JP | 5969297 | B2 | 8/2016 |
| JP | 6064634 | B2 | 1/2017 |
| KR | 10-2016-0125285 | A | 10/2016 |
| KR | 10-1689865 | B1 | 12/2016 |

* cited by examiner

BATTERY CONTROL METHOD AND APPARATUS

CROSS-REFERENCE TO RELATED APPLICATIONS

This application claims the benefit under 35 USC § 119(a) of Korean Patent Application No. 10-2017-0122022 filed on Sep. 21, 2017 in the Korean Intellectual Property Office, the entire disclosure of which is incorporated herein by reference for all purposes.

BACKGROUND

1. Field

The following description relates to a battery control method and apparatus.

2. Description of Related Art

A battery pack in an electric vehicle supplies power to an inverter. An output voltage of the battery pack continuously varies based on a charging and discharging current with the inverter. In this example, the inverter may not operate stably. Recently, research on provision of a constant voltage to a load such as the inverter is being conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented battery control method includes calculating a boosting ratio based on measured voltage values of batteries and a preset voltage value, and transmitting the calculated boosting ratio to converters connected to the batteries, respectively. The converters are configured to boost output voltages of the batteries based on the calculated boosting ratio, and a sum of the boosted output voltages is equal to the preset voltage value.

When a number of batteries connected to the converters changes, the sum of the boosted output voltages may be maintained.

The calculating of the boosting ratio may include calculating the boosting ratio based on a sum of the voltage values of the batteries and the preset voltage value.

The calculated boosting ratio may be a result of dividing the preset voltage value by the sum of the voltage values of the batteries.

The calculating of the boosting ratio may include applying state values of the batteries to the voltage values of the batteries, determining a common boosting ratio for the converters based on results of the applying of the state values and the preset voltage value, and calculating boosting ratios for the converters based on the common boosting ratio and the state values of the batteries.

The calculated boosting ratios for the converters may result from multiplying the common boosting ratio by the state values of the batteries.

The states values of the batteries may include either one or both of states of charge (SOC) values and states of health (SOH) values of the batteries.

The calculating may include separately calculating the boosting ratios for the converters based on the preset voltage value, voltage values of the corresponding batteries of the converters, and any one or any combination of SOC values and SOH values of the corresponding batteries of the converters.

In response to any of the batteries being determined to be abnormal, a battery control apparatus or a slave of the battery control apparatus may bypass the abnormal battery through the converter of the abnormal battery.

The calculating of the boosting ratio may include calculating a boosting ratio for the converters except for the converter of the abnormal battery based on the preset voltage value and the voltage values of the batteries except for the abnormal battery.

The converters may be connected in series.

In another general aspect, a battery control apparatus includes a processor configured to calculate a boosting ratio for converters respectively connected to batteries based on voltage values of the batteries and a preset voltage value, and transmit the calculated boosting ratio to the converters. The converters may be configured to boost output voltages of the batteries based on the calculated boosting ratio, and a sum of the boosted output voltages may be equal to the preset voltage value.

The processor may be further configured to calculate the boosting ratio based on a sum of the voltage values of the batteries and the preset voltage value.

The calculated boosting ratio may be a result of dividing the preset voltage value by the sum of the voltage values of the batteries.

The processor may be further configured to apply state values of the batteries to the voltage values of the batteries, determine a common boosting ratio for the converters based on results of the applying and the preset voltage value, and calculate boosting ratios for the converters based on the common boosting ratio and the state values of the batteries.

The calculated boosting ratios for the converters may result from multiplying the common boosting ratio by the state values of the batteries.

The states values of the batteries may include either one or both of SOC values and SOH values of the batteries.

The processor may be further configured to separately calculate the boosting ratios for the converters based on the preset voltage value, voltage values of the corresponding batteries of the converters, and either one or both of SOC values and SOH values of the corresponding batteries of the converters.

In response to any of the batteries being determined to be abnormal, the battery control apparatus or a slave of the battery control apparatus may bypass the abnormal battery through the converter of the abnormal battery.

The processor may be further configured to calculate a boosting ratio for the converters except for the converter of the abnormal battery based on the preset voltage value and the voltage values of batteries except for the abnormal battery.

The converters may be connected in series.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1A:
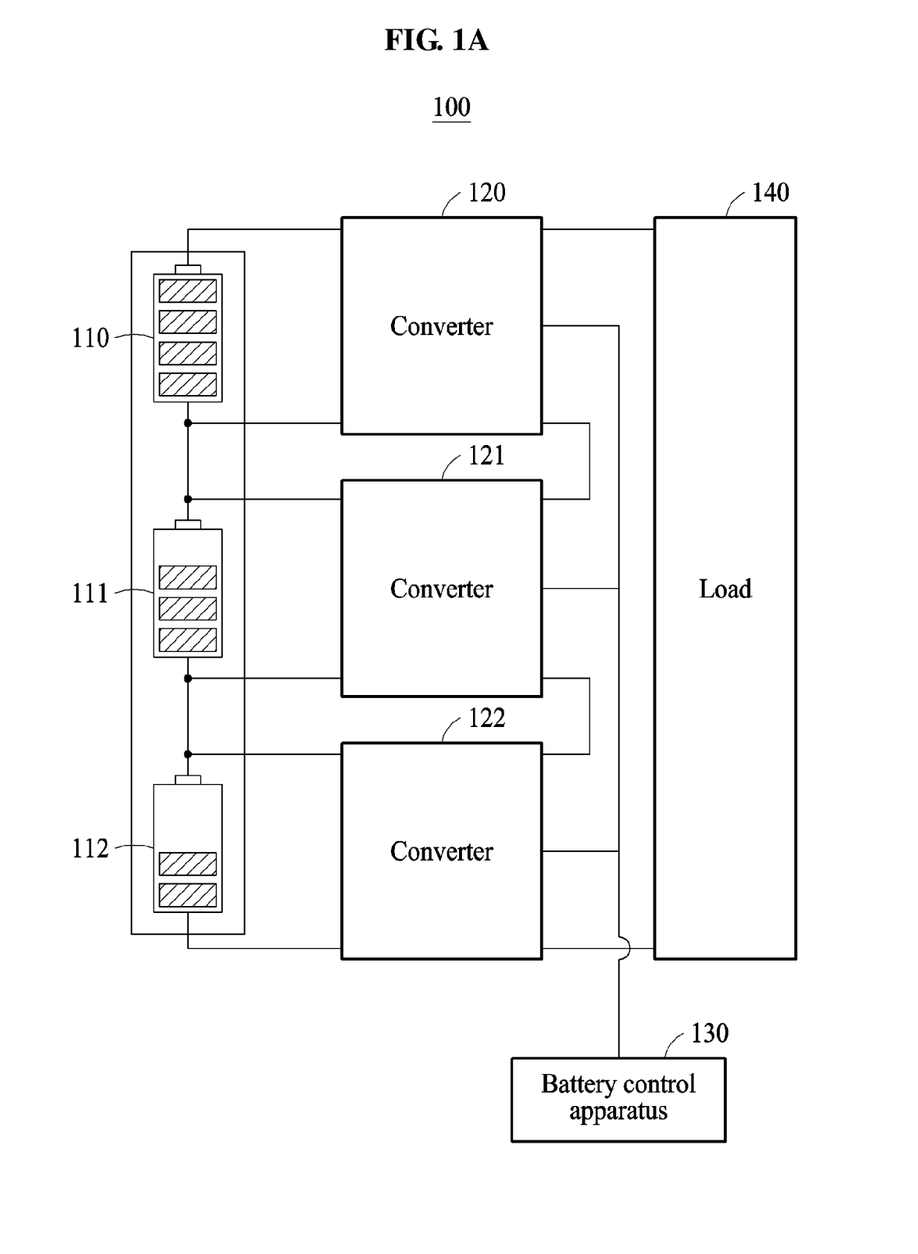
FIGS. 1A and 1B illustrate an example of a battery system.
Figure 1B:
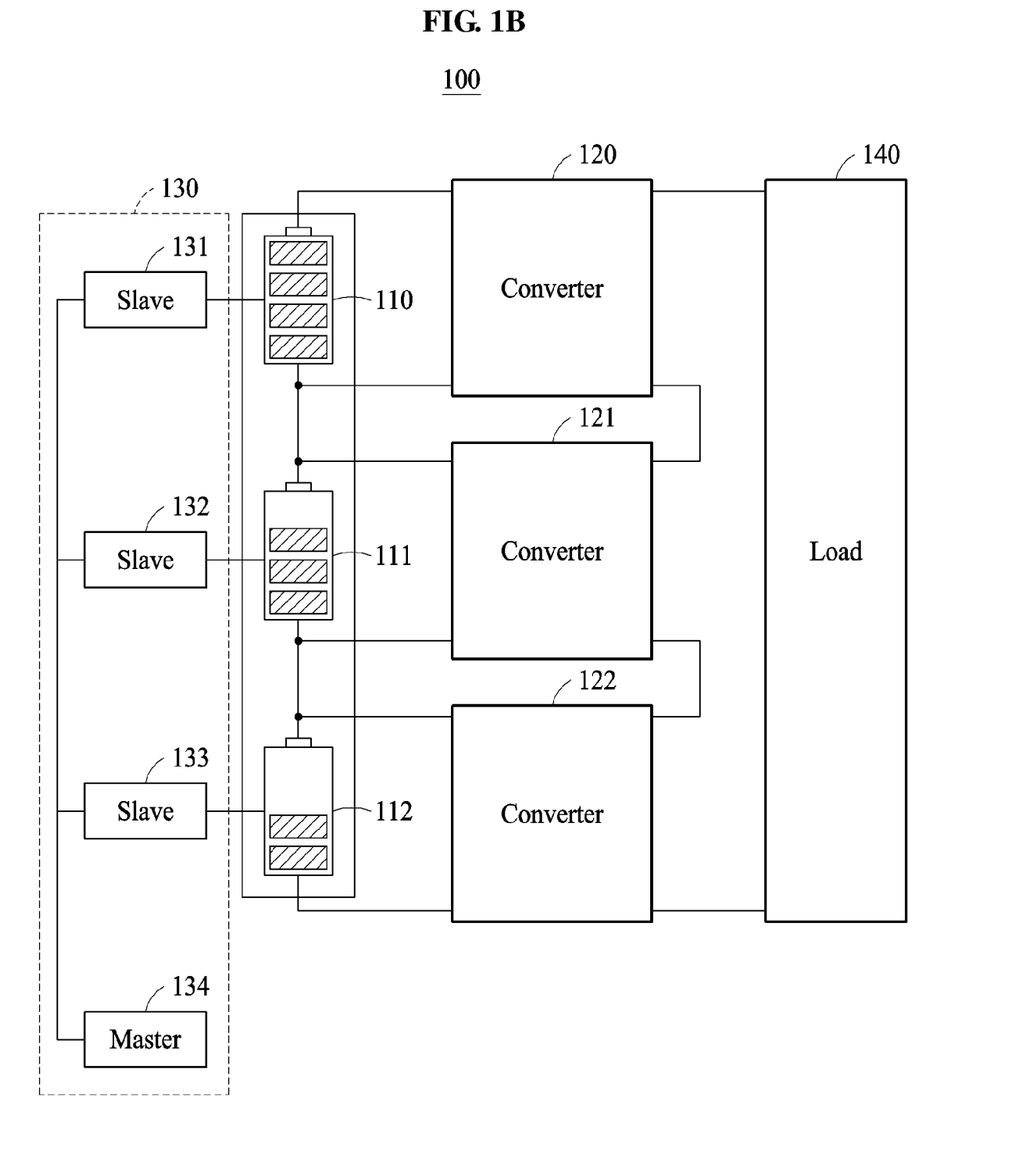

FIGS. 1A and 1B illustrate an example of a battery system.

Referring to FIG. 1A, a battery system 100 includes batteries 110 through 112, converters 120 through 122, a battery control apparatus 130, and a load 140.

The batteries 110 through 112 may be any one or any combination of any two or more of a battery cell, a battery module, and a battery pack.

The battery control apparatus 130 collects physical quantity values of the batteries 110 through 112 using at least one sensor. Here, the physical quantity values include any one or any combination of any two or more of a voltage value, a current value, and a temperature value. In an implementation, the battery control apparatus 130 has a master-slave structure. Referring to the example of FIG. 1B, the battery control apparatus 130 includes a master 134 and slaves 131 through 133. The slaves 131 through 133 correspond to the batteries 110 through 112, respectively. The slaves 131 through 133 each collect a physical quantity value by sensing the corresponding battery 110, 111 or 112, and transmit the collected physical quantity value to the master 134. This master-slave structure is used for a large number of batteries 110 through 112, for example, a large-capacity battery pack. In the master-slave structure, the master 134 and the slaves 131 through 133 share an operation of the battery control apparatus 130 which will be described later.

The battery control apparatus 130 calculates a boosting ratio for the converters 120 through 122 based on measured voltage values of the batteries 110 through 112 and a preset voltage value. Here, the preset voltage value corresponds to an operating voltage of the load 140. For example, if the operating voltage of the load 140 is 100 volts (V), the preset voltage value corresponds to 100 V.

The battery control apparatus 130 transmits the calculated boosting ratio to the converters 120 through 122.

The converters 120 through 122 boost voltages or output voltages of the batteries 110 through 112 based on the calculated boosting ratio. Here, the converters 120 through 122 are connected in series. For example, if the calculated boosting ratio is "10", the converter 120 boosts the voltage of the battery 110 "10" times, the converter 121 boosts the voltage of the battery 111 "10" times, and the converter 122 boosts the voltage of the battery 112 "10" times.

The converters 120 through 122 provide the boosted voltages to the load 140. In this example, a sum of the voltages boosted by the converters 120 through 122 is equal to the preset voltage value. Further, as described later, despite changes in states of a portion or all of the batteries 110 through 112, the sum of the voltages boosted by the converters 120 through 122 is maintained to be the preset voltage value. Thus, the load 140 is continuously supplied with a constant voltage from the converters 120 through 122.

The load 140 includes, for example, an inverter and/or a motor. However, the inverter and/or the motor are merely examples of the load 140, and the load 140 is not limited to the inverter and/or the motor.

Figure 2:
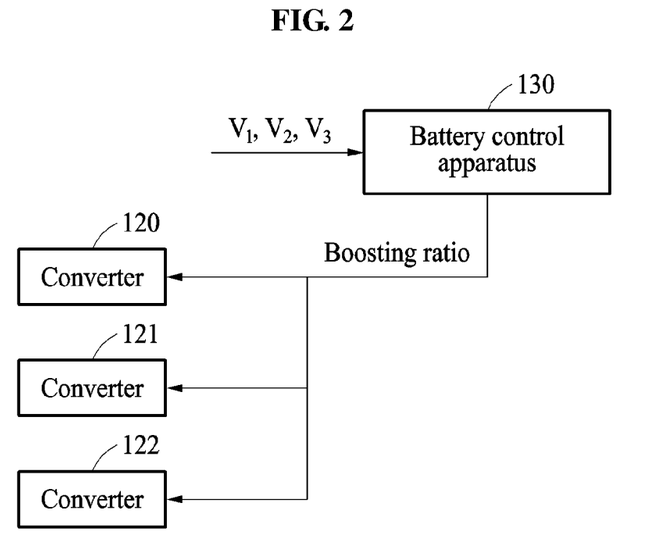
FIG. 2 illustrates an example of an operation of a battery control apparatus.

FIG. 2 illustrates an example of an operation of a battery control apparatus.

Referring to FIG. 2, the battery control apparatus 130 calculates a boosting ratio for the converters 120 through 122 based on a voltage value $V_1$ of the battery 110, a voltage value $V_2$ of the battery 111, a voltage value $V_3$ of the battery 112, and a preset voltage value $V_{set}$. In an example, the battery control apparatus 130 calculates the boosting ratio for the converters 120 through 122 based on a sum of the voltage values $V_1$, $V_2$ and $V_3$, and the preset voltage value $V_{set}$. In another example, the battery control apparatus 130 calculates the boosting ratio for the converters 120 through 122 based on the voltage values of the batteries 110 through 112, state values of the batteries 110 through 112, and the preset voltage value $V_{set}$. In still another example, the battery control apparatus 130 calculates boosting ratios for the converters 120 through 122 based on the state values of the batteries 110 through 112. Hereinafter, the above examples will be described separately.

<Calculation of Boosting Ratio Based on Sum of Voltage Values of Batteries and Preset Voltage Value>

The battery control apparatus 130 calculates the boosting ratio for the converters 120 through 122 based on $V_1+V_2+V_3$ and $V_{set}$. For example, the battery control apparatus 130 calculates the boosting ratio for the converters 120 through 122 using Equation 1.

$$\text{Boosting Ratio} = V_{set}/(V_1+V_2+V_3) \quad \text{[Equation 1]}$$

In the example of FIG. 2 where $V_1=5$ V, $V_2=3$ V, $V_3=2$ V, and $V_{set}=100$ V, the battery control apparatus 130 calculates the boosting ratio for the converters 120 through 122 to be "10". That is, the battery control apparatus 130 determines a boosting ratio $D_1$ for the converter 120 to be "10", a boosting ratio $D_2$ for the converter 121 to be "10", and a boosting ratio $D_3$ for the converter 122 to be "10". Here, $V_{set}$ corresponds to an operating voltage of the load 140.

The battery control apparatus 130 transmits the calculated boosting ratio to the converters 120 through 122.

The converters 120 through 122 each boost a voltage of the corresponding battery 110, 111 or 112 based on the calculated boosting ratio. The converter 120 boosts the voltage of 5 V of the battery 110 "10" times and outputs a voltage of 50 V to the load 140. The converter 121 boosts the voltage of 3 V of the battery 111 "10" times and outputs a voltage of 30 V to the load 140. Further, the converter 122 boosts the voltage of 2 V of the battery 112 "10" times and outputs a voltage of 20 V to the load 140. A sum of the output voltages of the converters 120 through 122 is 100 V, which is equal to the operating voltage of the load 140, that is, $V_{set}$. The converters 120 through 122 provide the voltage equal to the operating voltage of the load 140 to the load 140.

<Calculation of Boosting Ratios Based on Voltage Values of Batteries, State Values of Batteries, and Preset Voltage Value>

The battery control apparatus 130 calculates the state values of the batteries 110 through 112 based on physical quantity values of the batteries 110 through 112. Here, the state values include state of charge (SOC) values, and/or state of health (SOH) values.

The battery control apparatus 130 applies the state values of the batteries 110 through 112 to the voltage values of the batteries 110 through 112, calculates a common boosting ratio for the converters 120 through 122 based on results of the applying and the preset voltage value $V_{set}$, and calculates boosting ratios for the converters 120 through 122 based on the calculated common boosting ratio and the state values of the batteries 110 through 112. For example, the battery control apparatus 130 calculates $V_1 \times SOC_1 \times SOH_1$ by applying state values $SOC_1$ and $SOH_1$ of the battery 110 to $V_1$. Similarly, the battery control apparatus 130 calculates $V_2 \times SOC_2 \times SOH_2$ and $V_3 \times SOC_3 \times SOH_3$. The battery control apparatus 130 adds up $V_1 \times SOC_1 \times SOH_1$, $V_2 \times SOC_2 \times SOH_2$, and $V_3 \times SOC_3 \times SOH_3$, and calculates the common boosting ratio for the converters 120 through 122 using Equation 2. The battery control apparatus 130 calculates the boosting ratios for the converters 120 through 122 using Equation 3.

$$\text{Common Boosting Ratio} = V_{set}/(V_1 \times SOC_1 \times SOH_1 + V_2 \times SOC_2 \times SOH_2 + V_3 \times SOC_3 \times SOH_3) \quad \text{[Equation 2]}$$

$D_1 = \text{Common Boosting Ratio} \times SOC_1 \times SOH_1$ $D_2 = \text{Common Boosting Ratio} \times SOC_2 \times SOH_2$ $D_3 = \text{Common Boosting Ratio} \times SOC_3 \times SOH_3 \quad \text{[Equation 3]}$ In Equation 3, $D_1$ denotes the boosting ratio for the converter 120, $D_2$ denotes the boosting ratio for the converter 121, and $D_3$ denotes the boosting ratio for the converter 122.

In the example of FIG. 2 where $V_1=5$ V, $SOC_1=0.9$, $SOH_1=0.9$, $V_2=3$ V, $SOC_2=0.7$, $SOH_2=0.89$, $V_3=2$ V, $SOC_3=0.5$, and $SOH_3=0.88$, the battery control apparatus 130 determines the common boosting ratio to be about "14.71" through Equation 2. The battery control apparatus 130 determines $D_1$ to be about "11.91", $D_2$ to be about "9.16", and $D_3$ to be about "6.5", using Equation 3.

The battery control apparatus 130 transmits $D_1$, $D_2$, and $D_3$ to the converters 120 through 122, respectively.

The converters 120 through 122 each boost the voltage of the corresponding battery 110, 111 or 112 based on the corresponding boosting ratio $D_1$, $D_2$ or $D_3$. In the example of FIG. 2, the converter 120 boosts the voltage of 5 V of the battery 110 "11.91" times and outputs a voltage of about 59.55 V to the load 140, the converter 121 boosts the voltage of 3 V of the battery 111 "9.16" times and outputs a voltage of about 27.48 V to the load 140, and the converter 122 boosts the voltage of 2 V of the battery 112 "6.5" times and outputs a voltage of about 13 V to the load 140. A sum of the output voltages of the converters 120 through 122 is 100.03 V, which is approximately equal to the operating voltage of the load 140. The converters 120 through 122 provide the voltage equal to the operating voltage of the load 140 to the load 140.

<Separate Calculation of Boosting Ratios for Converters Based on States Values of Batteries>

The battery control apparatus 130 separately calculates the boosting ratios for the converters 120 through 122 based on the state values of the corresponding batteries 110, 111 and 112 of the converters 120 through 122, the voltage values of the corresponding batteries 110, 111 and 112, and the preset voltage value $V_{set}$. In this example, the battery control apparatus 130 separately calculates the boosting ratios for the converters 120 through 122 to satisfy Equation 4.

$$V_{set} = V_1 \times SOC_1 \times SOH_1 \times D_1 + V_2 \times SOC_2 \times SOH_2 \times D_2 + V_3 \times SOC_3 \times SOH_3 \times D_3 \quad \text{[Equation 4]}$$

In Equation 4, $D_1$ denotes the boosting ratio for the converter 120, $D_2$ denotes the boosting ratio for the converter 121, and $D_3$ denotes the boosting ratio for the converter 122.

The battery control apparatus 130 determines optimal $D_1$, $D_2$, and $D_3$ which accord with current states of the batteries 110 through 112.

Figure 3:
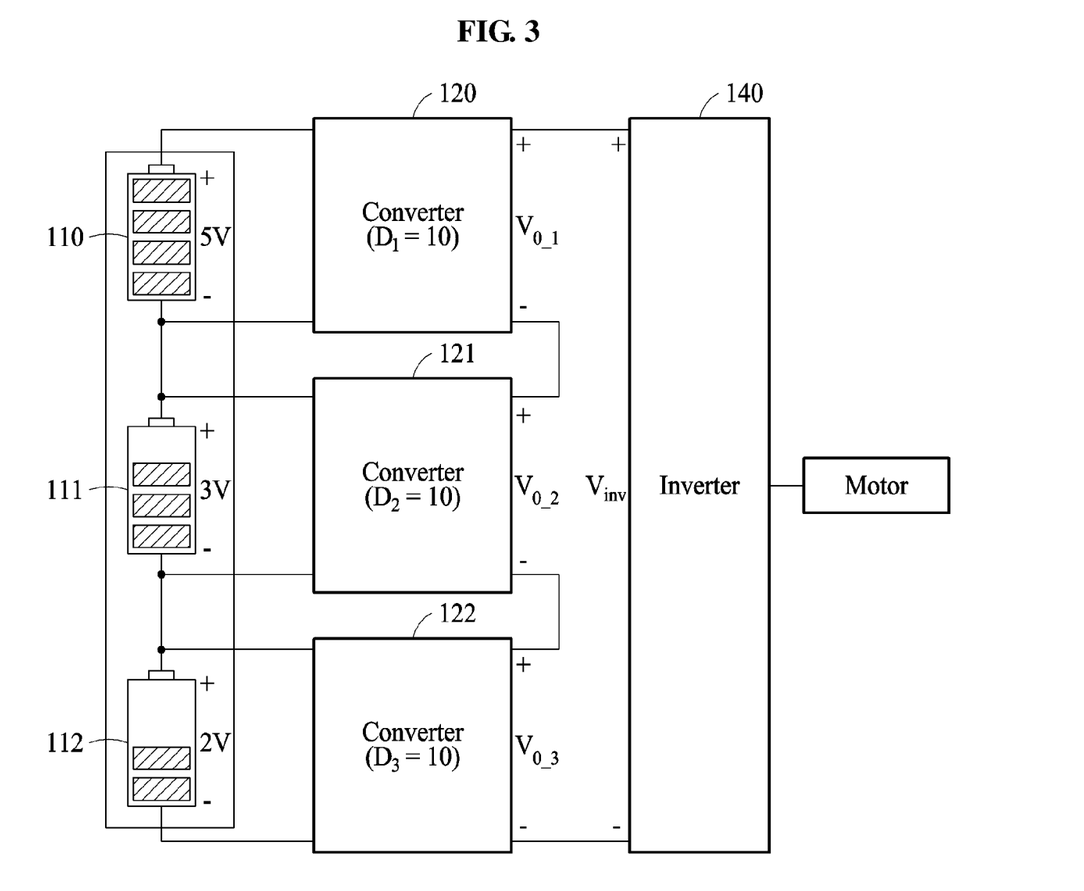
FIGS. 3 through 5 illustrate an example of a battery control apparatus maintaining a sum of output voltages of converters.
Figure 4:
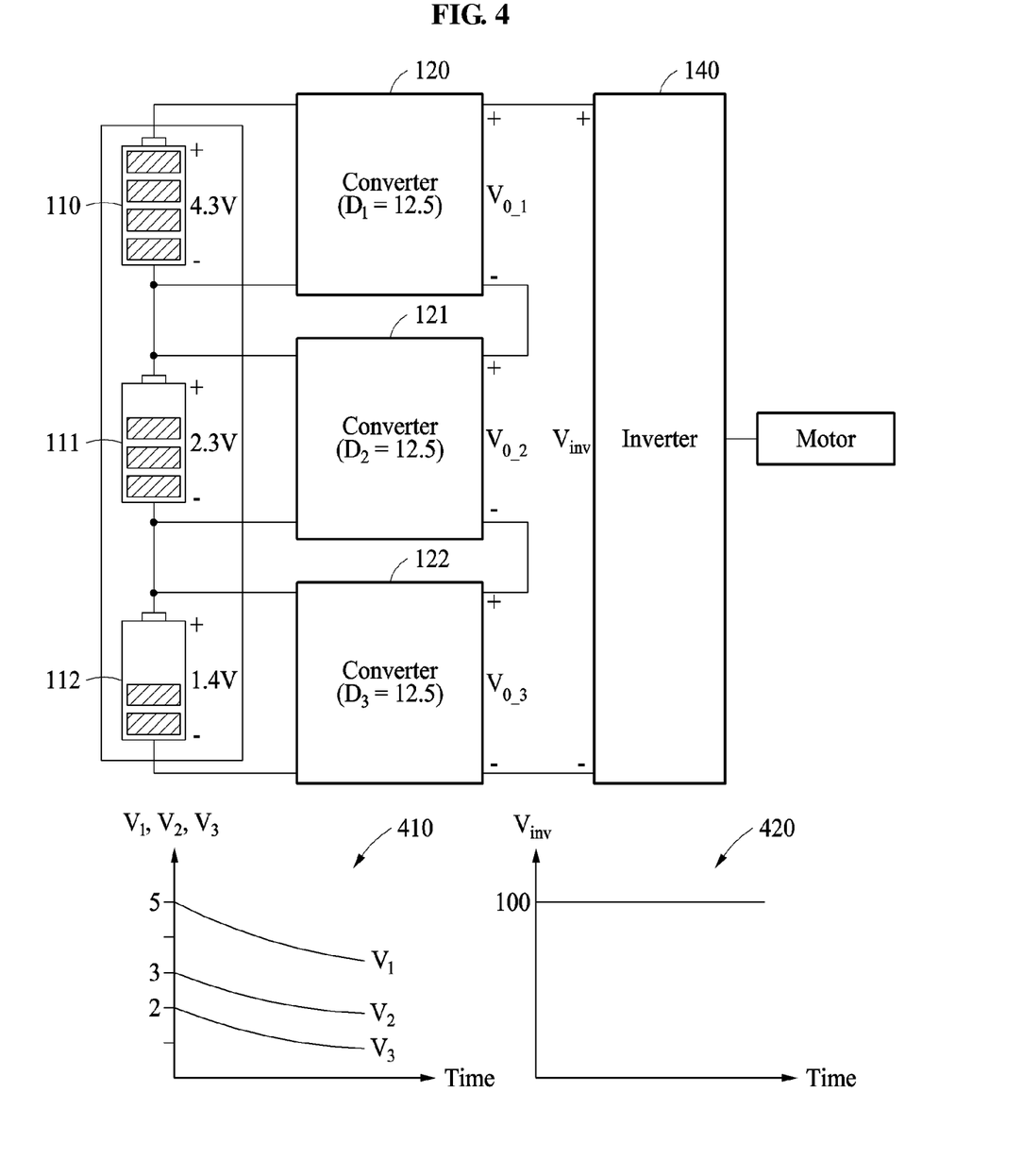
Figure 5:
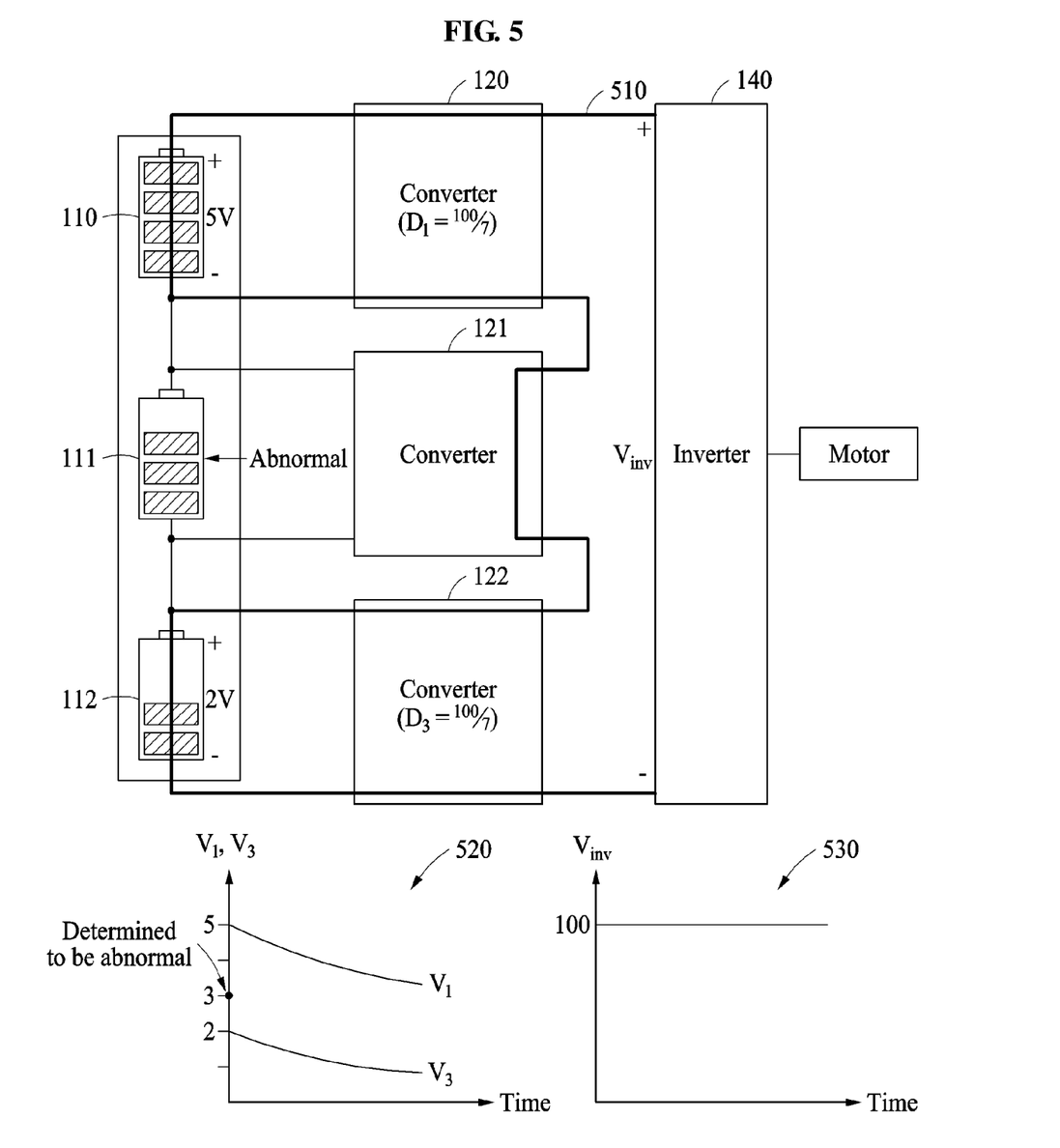

FIGS. 3 through 5 illustrate an example of a battery control apparatus maintaining a sum of output voltages of converters.

Referring to FIG. 3, a boosting ratio for the converters 120 through 122 is "10", and an operating voltage of the load 140, for example, the inverter, is 100 V. In the example of FIG. 3, the converter 120 boosts a voltage of 5V of the battery 110 "10" times, the converter 121 boosts a voltage of 3 V of the battery 111 "10" times, and the converter 122 boosts a voltage of 2 V of the battery 112 "10" times. A sum of the output voltages of the converters 120 through 122 is 100 V, which is equal to the operating voltage of 100 V of the load 140, for example, the inverter.

In response to the batteries 110 through 112 being discharged, the voltages of the batteries 110 through 112 decrease. In this example, if the converters 120 through 122 each boost the voltage of the corresponding battery 110, 111 or 112 with the boosting ratio of "10", it is difficult to supply a voltage of 100 V to the load 140. In an example, the battery control apparatus 130 adjusts the boosting ratio for the converters 120 through 122 to maintain the sum of the output voltages of the converters 120 through 122 to be 100 V. Hereinafter, the above example will be described further with reference to FIG. 4.

Referring to FIG. 4, in response to the batteries 110 through 112 being discharged, voltages of the batteries 110 through 112 respectively decrease to 4.3 V, 2.3 V and 1.4 V.

The battery control apparatus 130 obtains the voltage values of 4.3 V, 2.3 V and 1.4 V of the batteries 110 through 112, and calculates a boosting ratio for the converters 120 through 122 using one of the calculation schemes described with reference to FIG. 2. For example, the battery control apparatus 130 calculates the boosting ratio for the converters 120 through 122 to be "12.5" using Equation 1. The battery control apparatus 130 transmits the boosting ratio of "12.5" to the converters 120 through 122.

The converters 120 through 122 boost the voltages of the batteries 110 through 112 based on the boosting ratio of "12.5". In the example of FIG. 4, the converter 120 boosts the voltage of 4.3 V of the battery 110 "12.5" times and outputs a voltage of 53.75 V, the converter 121 boosts the voltage of 2.3 V of the battery 111 "12.5" times and outputs a voltage of 28.75 V, and the converter 122 boosts the voltage of 1.4 V of the battery 112 "12.5" times and outputs a voltage of 17.5 V. A sum of the output voltages of the converters 120 through 122 is 100 V. Thus, the sum of the output voltages of the converters 120 through 122 of FIG. 3 is maintained, and a constant voltage is supplied to the load 140. That is, although the voltages of the batteries 110 through 112 decrease as shown in a graph 410, the battery control apparatus 130 enables a constant voltage to be supplied to the load 140 as shown in a graph 420.

In an example, a portion of the batteries 110 through 112 may be abnormal. In this example, the battery control apparatus 130 calculates a boosting ratio for remaining converters except for a corresponding converter of the abnormal battery based on voltage values of remaining batteries except for the abnormal battery and the preset voltage value, and transmits the calculated boosting ratio to the remaining converters. The remaining converters boost and output voltages of the corresponding batteries, and a sum of the output voltages of the remaining converters is equal to the sum of the output voltages of the converters 120 through 122 of FIG. 3. That is, although a portion of the batteries 110 through 112 is abnormal, the battery control apparatus 130 enables a constant voltage to be supplied to the load 140. Hereinafter, the above example will be described further with reference to FIG. 5.

Referring to FIG. 5, the battery control apparatus 130 determines the battery 111 to be abnormal. For example, the battery control apparatus 130 estimates internal resistances of the batteries 110 through 112 based on physical quantity values of the batteries 110 through 112, and determines whether the batteries 110 through 112 are abnormal based on the estimated internal resistances. Here, in response to the estimated internal resistance of the battery 111 exceeding a threshold value, the battery control apparatus 130 determines the battery 111 to be abnormal. The method of determining whether the batteries 110 through 112 are abnormal is not limited to the example described above.

In response to determination that the battery 111 is abnormal, the battery control apparatus 130 bypasses the battery 111 through the converter 121. As in the example of FIG. 5, the battery control apparatus 130 excludes the battery 111 from a current path 510 using the converter 121.

The battery control apparatus 130 calculates a boosting ratio for the remaining converters 120 and 122 except for the converter 121 of the battery 111 based on voltage values $V_1$ and $V_3$ of the remaining batteries 110 and 112 except for the battery 111 and the preset voltage value $V_{set}$. For example, in a case in which $V_1=5$ V and $V_3=2$ V, the battery control apparatus 130 determines the boosting ratio for the remaining converters 120 and 122 to be "100/7" using Equation 1. The battery control apparatus 130 transmits the boosting ratio of "100/7" to the remaining converters 120 and 122.

The converter 120 boosts the voltage of 5 V of the battery 110 "100/7" times and outputs a voltage of 500/7 V, and the converter 122 boosts the voltage of 2 V of the battery 112 "100/7" times and outputs a voltage of 200/7 V. A sum of the output voltages of the converters 120 and 122 is 100 V. Thus, the sum of the output voltages of the converters 120 through 122 of FIG. 3 is maintained, and a constant voltage is supplied to the load 140. That is, although the battery 111, among the batteries 110 through 112, is determined to be abnormal and unable to supply a voltage as shown in a graph 520, the battery control apparatus 130 enables a constant voltage to be supplied to the load 140 as shown in a graph 530.

Figure 6:
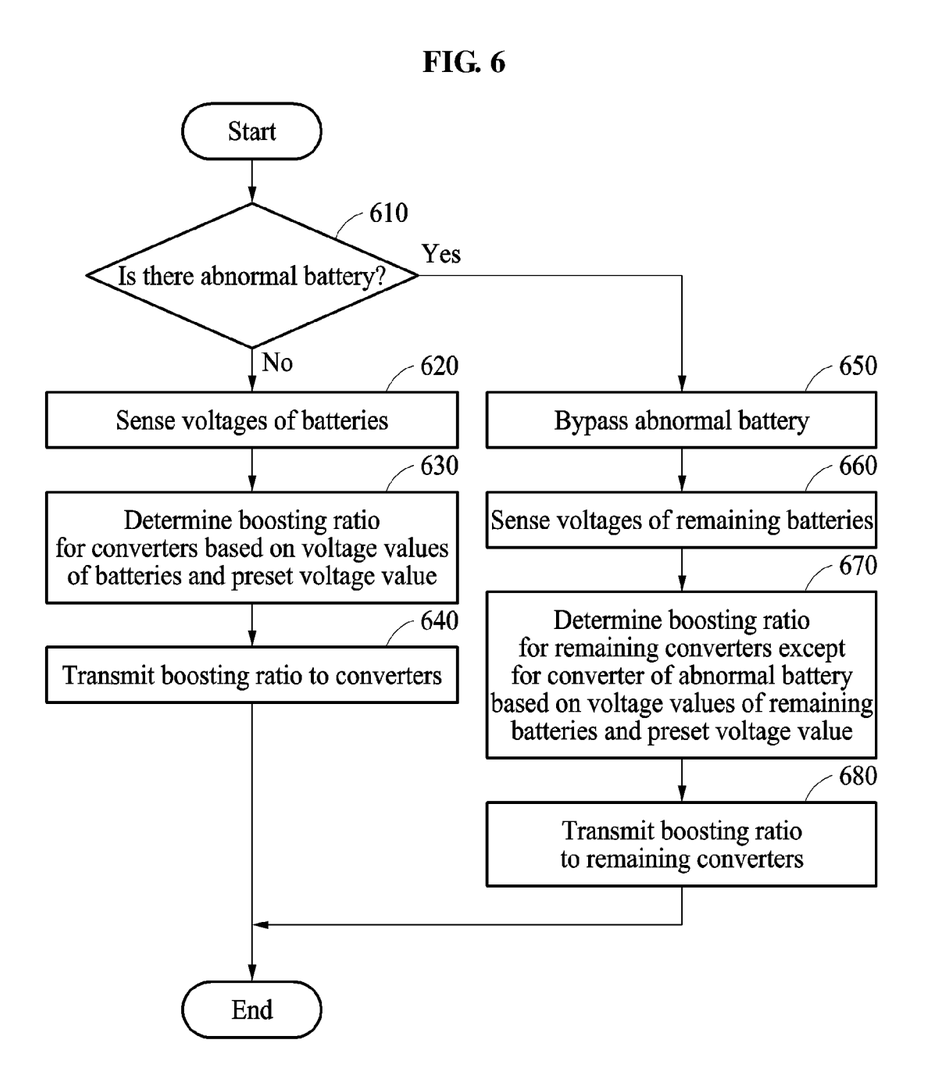
FIG. 6 is a flowchart illustrating an example of a battery control method.

FIG. 6 is a flowchart illustrating an example of a battery control method.

The battery control method of FIG. 6 is performed by the battery control apparatus 130.

Referring to FIG. 6, in operation 610, the battery control apparatus 130 determines whether there is an abnormal battery among the batteries 110 through 112.

In response to determination that there is no abnormal battery, the battery control apparatus 130 senses voltages of the batteries 110 through 112 using at least one voltage sensor, in operation 620. The battery control apparatus 130 obtains the voltage values of the batteries 110 through 112. In operation 630, the battery control apparatus 130 determines a boosting ratio for the converters 120 through 122 based on the voltage values of the batteries 110 through 112 and a preset voltage value. In operation 640, the battery control apparatus 130 transmits the determined boosting ratio to the converters 120 through 122.

In response to determination that there is an abnormal battery, the battery control apparatus 130 bypasses the abnormal battery, in operation 650. In operation 660, the battery control apparatus 130 senses voltages of remaining batteries except for the abnormal battery. In operation 670, the battery control apparatus 130 determines a boosting ratio for remaining converters except for a corresponding converter of the abnormal battery based on the voltage values of the remaining batteries and the preset voltage value. In operation 680, the battery control apparatus 130 transmits the determined boosting ratio to the remaining converters.

In an implementation, the battery control apparatus 130 has a mater-slave structure as described through FIG. 1B. In this example, the slaves 131 through 133 and the master 134 share operations 610 through 680. For example, the slaves 131 through 133 perform operations 610, 620, 650, and 660. In operation 610, the slaves 131 through 133 each determine whether the corresponding battery 110, 111 or 112 is abnormal. In response to the corresponding battery 110, 111 or 112 not being an abnormal battery, the slaves 131 through 133 each sense a voltage of the corresponding battery 110, 111 or 112 in operation 620, and transmit the voltage value to the master 134. The master 134 performs operations 630 and 640. In operation 610, the slave 132 determines the battery 111 to be abnormal, and the remaining slaves 131 and 133 each determine the corresponding battery 110 or 112 to be normal. In this example, the slave 132 of the battery 111 bypasses the battery 111 in operation 650. The remaining slaves 131 and 133 each sense the voltage of the corresponding battery 110 or 112 in operation 660, and transmit the voltage value to the master 134. The master 134 performs operations 670 and 680.

The description provided with reference to FIGS. 1A through 5 is applicable to the description provided with reference to FIG. 6, and thus duplicate description will be omitted for conciseness.

Figure 7:
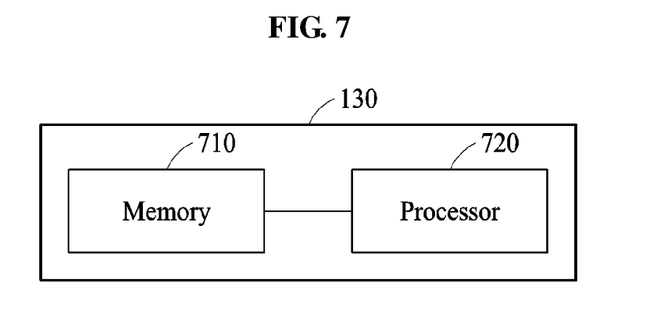
FIG. 7 is a block diagram illustrating an example of a battery control apparatus.

FIG. 7 is a block diagram illustrating an example of a battery control apparatus.

Referring to FIG. 7, the battery control apparatus 130 includes a memory 710 and a processor 720.

The memory 710 stores voltage values of the batteries 110 through 112.

The processor 720 determines a boosting ratio for the converters 120 through 122 based on the voltage values of the batteries 110 through 112 and a preset voltage value.

The processor 720 transmits the determined boosting ratio to the converters 120 through 122.

The description provided with reference to FIGS. 1A through 6 is applicable to the description provided with reference to FIG. 7, and thus duplicate description will be omitted for conciseness.

The battery control apparatus 130 may be mounted on various electronic devices, for example, a vehicle, a walking assistance device, a drone, and a mobile terminal, which use a battery as a power source, and may perform the operations described with reference to FIGS. 1A through 7. Hereinafter, a case in which the battery control apparatus 130 is mounted on a vehicle will be described with reference to FIG. 8.

Figure 8:
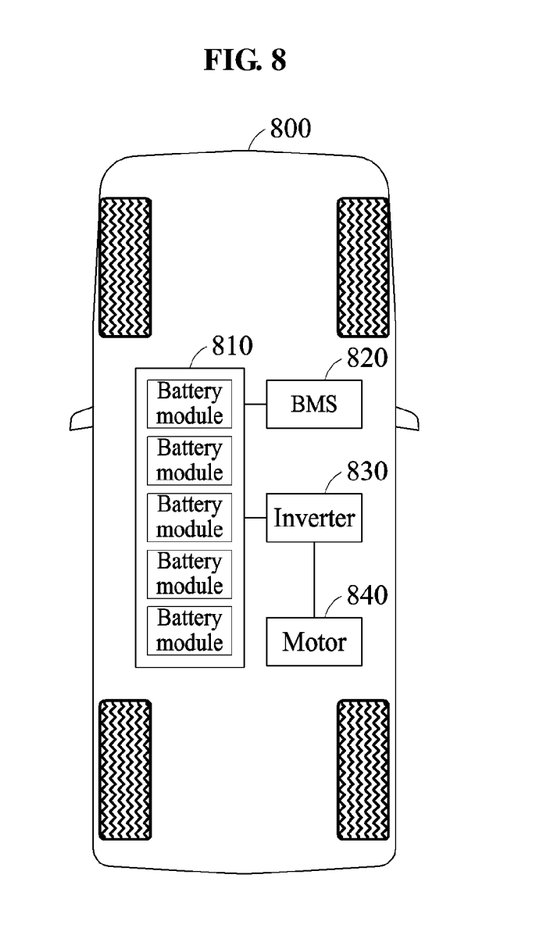
FIG. 8 illustrates an example of a vehicle.

FIG. 8 illustrates an example of a vehicle.

Referring to FIG. 8, a vehicle 800 includes a battery pack 810, a battery management system (BMS) 820, an inverter 830, and a motor 840. The vehicle 800 uses the battery pack 810 as a power source. The vehicle 800 is, for example, an electric vehicle or a hybrid vehicle.

The battery pack 810 includes battery modules. Here, the battery modules each include battery cells and converters, and the converters boost voltages of the battery cells. The description of the converters 120 through 122 is applicable to the converters included in each of the battery modules, and thus duplicate description will be omitted for conciseness.

The BMS 820 includes the battery control apparatus 130. The BMS 820 enables the battery pack 810 to output a voltage corresponding to an operating voltage of the inverter 830 and to continuously maintain the voltage, using the battery control apparatus 130. Thus, the inverter 830 is continuously supplied with a constant voltage from the battery pack 810. Further, the inverter 830 is supplied with the constant voltage even when the state of a battery module in the battery pack 810 or a battery cell in the battery module changes. Hence, the speed control performance of the motor 840 improves, and the torque of the motor 840 increases as adequate and accurate amount of current is supplied to the motor 840 during spirited driving.

The description provided with reference to FIGS. 1A through 7 is applicable to the description provided with reference to FIG. 8, and thus duplicate description will be omitted for conciseness.

The battery control apparatus 130, and other apparatuses, units, modules, devices, and other components described herein with respect to FIGS. 1A-5 and 7-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The battery control method illustrated in FIG. 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented battery control method, comprising:
   determining whether an abnormal battery is in a plurality of batteries;
   controlling a converter of the abnormal battery to bypass the abnormal battery in response to the abnormal battery being in the batteries;
   calculating a boosting ratio for each of converters respectively connected to remaining batteries except for the abnormal battery such that a sum of plural items is equal to a preset voltage value, wherein each of the items indicates a result of multiplying a voltage value of each remaining battery, a state of charge (SOC) value of each remaining battery, a state of health (SOH) value of each remaining battery, and the calculated boosting ratio for a corresponding converter of each remaining battery; and
   transmitting the calculated boosting ratios to the converters,
   wherein the converters are configured to boost output voltages of the remaining batteries based on the calculated boosting ratios.

2. The method of claim 1, wherein when a number of batteries connected to the converters changes, the sum of the boosted output voltages is maintained.

3. The battery control method of claim 1, wherein the converters are connected in series.

4. A non-transitory computer-readable storage medium storing instructions that, when executed by a processor, cause the processor to perform the battery control method of claim 1.

5. The method of claim 1, further comprising:
   adjusting the boosting ratio for the converters in response to voltages of the remaining batteries decreasing.

6. A battery control apparatus, comprising:
   a processor configured to
      determine whether an abnormal battery is in a plurality of batteries;
      control a converter of the abnormal battery to bypass the abnormal battery in response to the abnormal battery being in the batteries;
      calculate a boosting ratio for each of converters respectively connected to remaining batteries except for the abnormal battery such that a sum of plural items is equal to a preset voltage value, wherein each of the items indicates a result of multiplying a voltage value of each remaining battery, a state of charge (SOC) value of each remaining battery, a state of health (SOH) value of each remaining battery, and the calculated boosting ratio for a corresponding converter of each remaining battery, and
      transmit the calculated boosting ratios to the converters, wherein the converters are configured to boost output voltages of the remaining batteries based on the calculated boosting ratios.

7. The battery control apparatus of claim 6, wherein the converters are connected in series.

8. The battery control apparatus of claim 6, wherein the processor is further configured to adjust the boosting ratio for the converters in response to voltages of the remaining batteries decreasing.

* * * * *